July 7, 1953  M. FILL  2,644,194
AITCH BONE CUTTER
Filed Jan. 19, 1951
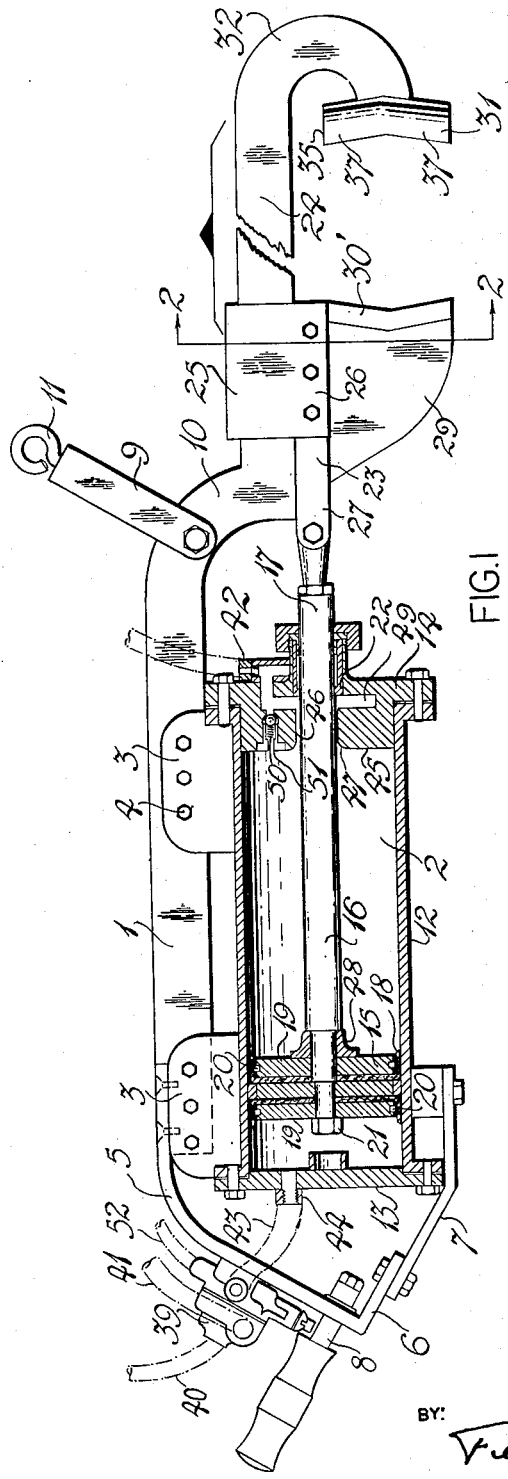
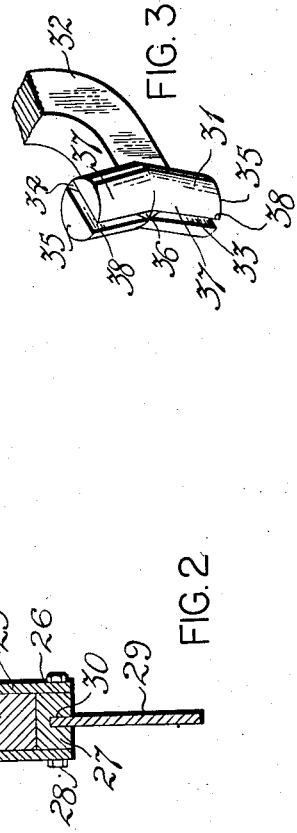
INVENTOR:
METRO FILL
BY:
Fetherstonhaugh & Kent.
HIS ATTY'S Patented July 7, 1953

2,644,194

UNITED STATES PATENT OFFICE 2,644,194

AITCHBONE CUTTER

Metro Fill, West Kildonan, Manitoba, Canada, assignor to Canada Packers Limited, Saint Boniface, Manitoba, Canada Application January 19, 1951, Serial No. 206,815

1 Claim. (Cl. 17—23)

My invention relates to new and useful improvements in aitch bone cutters for use in the processing of beef cattle, an object of my invention being to provide a device of the character herewithin described whereby the aitch bone can be cleaved or split efficiently and rapidly by a single operator.

A further object of my invention is to provide a device of the character herewithin described which prevents the formation of bone chips or dust during the splitting process.

Another object of my invention is to provide a device of the character herewithin described which can be used without alteration upon any size of carcass.

A still further object of my invention is to provide a device of the character herewithin described which is particularly suitable for use on cattle suspended by the hind legs upon a moving rail.

Yet another object of my invention is to provide a device of the character herewithin described which includes means to permit the positive location of the device upon the carcass prior to the cutting action occurring thereby facilitating the efficient splitting of the carcass.

A still further object of my invention is to provide a device of the character herewithin described which enables a clean split to be made which increases the marketability of the butchered carcass.

Yet another object of my invention is to provide a device of the character herewithin described which is economical in manufacture, simple in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of my device per se with the piston and cylinder portions sectioned to show the interior thereof.

Figure 2 is a section along the line 2—2 of Figure 1 but with the anvil removed.

Figure 3 is an enlarged fragmentary perspective view of the anvil per se.

In the drawings like characters of reference indicate corresponding parts in the different figures.

During the processing of beef cattle and the like, it is normal practice to split the carcass lengthwise down the backbone at the completion of the processing. This necessitates cleavage of the aitch bone or pelvis adjacent the base of the spine, and due to the awkward shape of this bone, considerable splintering or ragged cutting may result.

In order to provide a clean, accurately positioned split of the aitch bone, I have designed the cutter hereinafter to be described which may be operated by one man and which, due to the means provided, may be positioned accurately over the aitch bone before the splitting thereof. This device is particularly suitable for the splitting of aitch bones while the carcass is suspended from an overhead rail by the hind legs thereof after which the longitudinal splitting of the spine may be carried out in the conventional manner.

Proceeding now to describe my invention in detail, it will be seen upon reference to the accompanying drawings that I have provided a frame or framework 1 manufactured preferably from square stock, from which a piston and cylinder assembly collectively designated 2 depends by virtue of pairs of upstanding lugs 3 embracing the underside of the framework 1 and being secured thereto by means of bolts 4.

A downwardly extending substantially V-shaped extension 5 and 6 is provided at the rear end of the framework 1, the depending portion 7 of this extension being secured to the underside of the piston and cylinder assembly 2. A steadying handle 8 is secured to the portion 5 and a suspending element or clevis 9 is bolted to the forward end 10 of the supporting framework, being provided with a hook 11 upon the upper end thereof by which the entire assembly may be suspended by means of a chain (not illustrated), from a convenient point.

The piston and cylinder assembly 2 comprises a cylinder 12, having a rear end cap 13 bolted thereto together with a front end cap collectively designated 14, also bolted to the cylinder as clearly illustrated in the drawings.

A piston, collectively designated 15 is mounted for reciprocation within the cylinder and is secured upon the inner end of a piston rod 16, the opposite end 17 of which extends forwardly through the aforementioned front end cap 14 of the cylinder.

The aforementioned piston 15 is conventional in design and comprises a pair of leather cup packings 18 situated in opposition between follower plate 19 being provided with piston ring expanders 20, the assembly being held upon the end of the aforementioned piston rod 16 by means of a nut 21.

The forward end 17 of the piston rod is supported within a bearing 22 provided within the front end cap 14, and secured to this forward end is a cleaving blade assembly collectively designated 23.

Means to support this cleaving blade assembly during the reciprocation thereof is provided, and takes the form of an outboard supporting bar 24 extending from the down-turned end 10 of the framework 1. The cleaving blade assembly comprises a sheave bracket or guide 25 embracing the bar 24 (which is of square cross-sectional configuration), the side 26 of the bracket extending downwardly upon each side of the member 27 secured to the forward end of the piston rod 17.

Reference to Figure 2 will show the means of attachment hereinbefore described and it will be seen that the bracket 25 is channel shaped in cross-section and is bolted to the member 27 by means of bolt 28 which also holds the cleaving blade 29 within a slot 30 formed within the underside of the member 27.

The blade 29 is of the configuration shown in Figure 1 and it will be noted that the leading cutting edge 30' of the blade is of shallow V-shaped configuration when viewed in side elevation, the purpose of which will hereinafter be described.

A V-shaped anvil 31, is provided upon the distal substantially J-shaped down-turned end 32 of the supporting bar 24 which curves rearwardly so that anvil 31 faces the leading cutting edge 30' of the blade 29. Figure 3 shows the details of this anvil which is made from a pair of complemental half-sections which are spaced apart to afford a blade receiving slot 33. The base 34 of slot 33 inclines upwardly from each end 35 of the anvil to a common apex 36 located centrally within the anvil, the angle of inclination of the aforementioned base 34 of the slot conforming with the aforementioned V-shaped configuration of the leading cutting edge 30' of the blade. It will also be noted that the upper and lower portions 37 of the anvil are angulated with respect to each other so that the flanks 38 of the slot 33 enclose the leading cutting edge of the blade when same is in the forward position.

The reciprocation of the blade assembly 23 is provided by means of the aforementioned cylinder and piston assembly 2 which in turn is controlled from a conventional air-controlled valve 39 situated adjacent the handle 8. A conduit 40 extends from a source of compressed air to the valve 39 and a further conduit 41 extends from the valve to a forward union 42 situated within the front end cap 14 of the cylinder. A further conduit 43 extends from the valve 39 to a union 44 situated within the rear end cap 13 of the cylinder.

It will be noted upon reference to Figure 1 that the inner portion 45 of the front end cap 14 is apertured as at 46, said aperture being of a larger diameter than the piston rod 16 and also being provided with a rounded inner edge portion 47 against which a complementing shock-absorbing packing 48 situated behind the piston 15, may bear when the piston is at the forward limit of its scope. Aperture 46 communicates with an annular chamber 49 which, in turn, communicates with the aforementioned union 42. It will also be noted that a spring loaded valve 50 is provided within an aperture or drilling 51 which extends from the interior of the cylinder 12 to the aforementioned annular chamber 49, the purpose of which will hereinafter be described.

In operation, the piston is in substantially the position shown in Figure 1 whereupon the anvil may be placed over the aitch bone (not illustrated) between the hind quarters of the animal and positioned against the rear of the aitch bone. This positioning is facilitated by the angulated formation of the anvil as hereinbefore described. The valve 39 is now actuated to permit compressed air to flow through conduit 43 and into the cylinder behind the piston 15 thus driving the piston forwardly. This causes the blade assembly 23 to move forwardly supported upon the outboard supporting bar 24 so that the cutting edge 30' of the blade 29 cleaves through the aitch bone to the anvil 31 therebehind. It will be noted that the V-shaped cutting edge 30' enters the anvil by means of the slot 33 thus ensuring efficient and complete cleavage of the aitch bone.

The valve 39 is now actuated to cause compressed air to pass through conduit 41 to the union 42 situated at the front end of the cylinder 12 and it will be appreciated that with the piston 15 at the forward limit of its stroke, the shock-absorbing packing or bushing 48 has entered the aperture 46. As air passes through union 42 to the annular chamber 49, it displaces spring-loaded ball valve 50 thus causing air to act upon the front of piston 15 thus initiating rearward movement of the assembly. As soon as the packing or bushing 48 has left aperture 46, the full force of the compressed air can then pass through this aperture and act directly upon the front surface of the piston thus driving it completely to the rear in the conventional manner.

In conclusion, I wish to point out that air from the dead side of the piston is exhausted through conduit 52 incorporated within the valve 39.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A cutter of the character described, comprising an elongated supporting frame having front and rear ends, an angulated substantially V-shaped extension provided at the rear end of said frame and extending laterally therefrom, a cylinder secured to and depending from the rear end portion of the frame in parallel relation thereto and having its rear end portion secured to the depending portion of said V-shaped extension, a handle and a control valve provided on said V-shaped extension, said cylinder including a reciprocable piston and a piston rod projecting outwardly from the front end of the cylinder, means operatively connecting said control valve to opposite ends of said cylinder and delivering fluid under pressure selectively to front and rear sides of said piston for reciprocating the same, a suspension element provided on an intermediate portion of said frame for attaching the same to an overhead support, a guide slidably mounted on the front portion of the frame, a blade carried by said guide and depending therefrom, said blade having a V-shaped cutting edge at the front thereof, the projecting portion of said piston rod being operatively connected to said guide, a substantially J-shaped extension provided at the front end of said frame, a substantially V-shaped anvil secured to said J-shaped extension in opposing relation to said blade, said anvil comprising a pair of complemental half-sections spaced transversely apart and affording a slot therebetween to receive the cutting edge of said blade when said piston is in its full forward position.

METRO FILL.

References Cited in the file of this patent

UNITED STATES PATENTS

| Number | Name | Date |
|---|---|---|
| 767,552 | Eastman | Aug. 16, 1904 |
| 858,271 | Faessler | June 25, 1907 |
| 2,165,209 | Baldanza | July 11, 1939 |
| 2,337,236 | Gamble | Dec. 21, 1943 |